US012745212B2

(12) United States Patent
Keshavamurthy et al.

(10) Patent No.: US 12,745,212 B2
(45) Date of Patent: Sep. 22, 2026

(54) METHODS AND APPARATUSES FOR SIDELINK POSITIONING

(71) Applicant: Nokia Technologies Oy, Espoo (FI)

(72) Inventors: Prajwal Keshavamurthy, Munich (DE); Stepan Kucera, Munich (DE); Diomidis Michalopoulos, Munich (DE); Anastasios Kakkavas, Munich (DE)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 18/440,886

(22) Filed: Feb. 13, 2024

(65) Prior Publication Data

US 2024/0284397 A1 Aug. 22, 2024

(30) Foreign Application Priority Data

Feb. 16, 2023 (GB) ..................................... 2302216

(51) Int. Cl.
*H04W 4/029* (2018.01)
*G01S 5/00* (2006.01)
(Continued)

(52) U.S. Cl.
CPC ......... *H04W 64/006* (2013.01); *G01S 5/0072* (2013.01); *G01S 5/0236* (2013.01); *H04W 8/24* (2013.01)

(58) Field of Classification Search
CPC ....... H04W 8/22; H04W 8/24; H04W 64/006; H04W 4/025; H04W 64/00; G01S 5/0072; G01S 5/0236; H04L 5/0048; H04L 5/0053
See application file for complete search history.

(56) References Cited

U.S. PATENT DOCUMENTS 10,314,000 B2 6/2019 Huang et al.
11,496,914 B2 11/2022 Choi et al.
(Continued)

FOREIGN PATENT DOCUMENTS

WO 2022/220951 A2 10/2022

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 6 pages.
(Continued)

*Primary Examiner* — Phuoc H Doan
(74) *Attorney, Agent, or Firm* — Nokia Technologies Oy

(57) ABSTRACT

Embodiments of the present disclosure disclose methods and apparatuses for sidelink positioning. A first terminal device transmits capability information of the first terminal device along with a positioning reference signal (PRS), and the capability information indicates a capability to provide the location information of the first terminal device. Then the first terminal device receives a request for the location information of the first terminal device from a second terminal device. Based on receiving the request, the first terminal device transmits the location information along with a subsequent PRS. As such, in embodiments of the present disclosure, the first terminal device may transmit location information according to the request of the second terminal device. Thereby the sidelink positioning performance is improved.

14 Claims, 6 Drawing Sheets

(51) Int. Cl.
*G01S 5/02* (2010.01)
*H04W 8/24* (2009.01)
*H04W 64/00* (2009.01)

(56) References Cited

U.S. PATENT DOCUMENTS

2022/0015057 A1 1/2022 Bao et al.
2022/0070844 A1 3/2022 Lee et al.
2022/0236365 A1* 7/2022 Ko .......................... G01S 7/006
2022/0394659 A1 12/2022 Vassilovski et al.
2025/0193925 A1* 6/2025 Dong .................... H04L 5/0053
2025/0203565 A1* 6/2025 Zheng ................... H04W 24/08

OTHER PUBLICATIONS

"3rd Generation Partnership Project; Technical Specification Group Radio Access Network; Study on expanded and improved NR positioning; (Release 18)", 3GPP TR 38.859, V18.0.0, Dec. 2022, 632 pages.
"New WID on Expanded and Improved NR Positioning", 3GPP TSG RAN Meeting #98-e, RP-223549, Agenda: 9.1.1, Intel Corporation, Dec. 12-16, 2022, pp. 1-7.
"3rd Generation Partnership Project; Technical Specification Group Radio Access Network; Study on scenarios and requirements of in-coverage, partial coverage, and out-of-coverage NR positioning use cases (Release 17)", 3GPP TR 38.845, V17.0.0, Sep. 2021, pp. 1-16.
"3rd Generation Partnership Project; Technical Specification Group Services and System Aspects; Service requirements for the 5G system; Stage 1 (Release 19)", 3GPP TS 22.261, V19.1.0, Dec. 2022, 115 pages.
"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.
"LS reply to 3GPP RAN on requirements of in-coverage, partial coverage, and out-of-coverage positioning use cases", 3GPP TSG RAN Meeting #91e, RP-210040, 5GAA, Mar. 16-26, 2021, pp. 1-5.
"Discussion of session-based and session-less sidelink positioning", 3GPP TSG-RAN WG2 Meeting #120, R2-2212109, Agenda item: 8.2.2, Nokia, Nov. 14-18, 2022, 4 pages.
"Study of Sidelink Positioning Architecture, Signaling and Procedures", 3GPP TSG RAN WG2 Meeting #120, R2-2212857, Agenda item: 8.2.2, Qualcomm Incorporated, Nov. 14-18, 2022, pp. 1-26.
"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"Summary of [AT119bis-e][424][POS] SLPP/RSPP protocol design (Qualcomm)", 3GPP TSG-RAN WG2 #119bis-e, R2-xxxxxxx, Agenda item: 8.2.2, Qualcomm Incorporated, Oct. 10-19, 2022, pp. 1-17.
"IEEE 802.11", Wikipedia, Retrieved on May 7, 2024, Webpage available at : https://en.wikipedia.org/wiki/IEEE_802.11.
Search Report received for corresponding United Kingdom Patent Application No. 2302216.3, dated Aug. 10, 2023, 4 pages.

* cited by examiner

METHODS AND APPARATUSES FOR SIDELINK POSITIONING

FIELD

Embodiments of the present disclosure generally relate to the field of communication, and in particular, to devices, methods, apparatuses and computer readable storage medium for sidelink positioning.

BACKGROUND

With the development of communication technology, sidelink (SL) positioning has been introduced to improve positioning efficiency and accuracy. SL positioning is based on transmissions of sidelink positioning reference signal (SL PRS) by multiple anchor user equipments (UE) to be received by a target UE in e.g. SL time difference of arrival (TDOA) methods or SL PRS exchange between the anchor UE(s) and target UEs in e.g. SL (multi-) round-trip time (RTT) method. SL positioning enables localization of the target UE and/or ranging of target UE with respect to a reference UE (e.g. anchor UE) within precise latency and accuracy requirements of the corresponding SL positioning.

Solutions for SL positioning are studied as part of 3GPP Release-18 study item "Study on expanded and improved new radio (NR) positioning" (FS_NR_pos_enh2) [RP-213588] which target to support use cases such as vehicle-to-everything (V2X), public safety, commercial and industrial-internet-of-things (IIoT). TR 38.859 captures the outcome of the study. Subsequently, work item on "Expanded and Improved NR Positioning" (NR_pos_enh2) [RP-223549] is approved in RAN #98, which includes SL positioning as a key objective. However, there is a need to enhance SL positioning to improve system performance.

SUMMARY

In general, example embodiments of the present disclosure provide devices, methods, apparatuses and computer readable storage medium for sidelink positioning.

In a first aspect, there is provided a first terminal device. The first terminal device comprises at least one processor and at least one memory storing instructions that, when executed by the at least one processor, cause the first terminal device at least to transmit capability information of the first terminal device along with a positioning reference signal (PRS), wherein the capability information indicates a capability to provide the location information of the first terminal device; receive, from a second terminal device, a request for the location information of the first terminal device; and based on receiving the request, transmit the location information along with a subsequent PRS.

In a second aspect, a second terminal device is provided. The second terminal device comprises at least one processor and at least one memory storing instructions that, when executed by the at least one processor, cause the second terminal device at least to receive, from a first terminal device, a positioning reference signal (PRS) along with capability information indicating a capability of the first terminal device to provide location information of the first terminal device; determine, based on the capability information, that the first terminal device transmits the PRS without the location information and has the capability to provide the location information; and transmit, to the first terminal device, a request for the location information of the first terminal device.

In a third aspect, a method is provided. The method comprises transmitting capability information of the first terminal device along with a positioning reference signal (PRS), wherein the capability information indicates a capability to provide the location information of the first terminal device; receiving, from a second terminal device, a request for the location information of the first terminal device; and based on receiving the request, transmitting the location information along with a subsequent PRS.

In a fourth aspect, a method is provided. The method comprises receiving, at a second terminal device from a first terminal device, a positioning reference signal (PRS) along with capability information indicating a capability of the first terminal device to provide location information of the first terminal device; determining, based on the capability information, that the first terminal device transmits the PRS without the location information and has the capability to provide the location information; and transmitting, to the first terminal device, a request for the location information of the first terminal device.

In a fifth aspect, an apparatus is provided. The apparatus comprises means for transmitting capability information of the first terminal device along with a positioning reference signal (PRS), wherein the capability information indicates a capability to provide the location information of the first terminal device; means for receiving, from a second terminal device, a request for the location information of the first terminal device; and means for based on receiving the request, transmitting the location information along with a subsequent PRS.

In a sixth aspect, an apparatus is provided. The apparatus comprises means for receiving, at a second terminal device from a first terminal device, a positioning reference signal (PRS) along with capability information indicating a capability of the first terminal device to provide location information of the first terminal device; means for determining, based on the capability information, that the first terminal device transmits the PRS without the location information and has the capability to provide the location information; and means for transmitting, to the first terminal device, a request for the location information of the first terminal device.

In a seventh aspect, a non-transitory computer readable medium is provided, comprising program instructions for causing an apparatus to perform at least the method according to third or fourth aspect.

In an eighth aspect, a computer program is provided, comprising instructions, which, when executed by an apparatus, cause the apparatus at least to: transmit capability information of the first terminal device along with a positioning reference signal (PRS), wherein the capability information indicates a capability to provide the location information of the first terminal device; receive, from a second terminal device, a request for the location information of the first terminal device; and based on receiving the request, transmit the location information along with a subsequent PRS.

In a ninth aspect, a computer program is provided, comprising instructions, which, when executed by an apparatus, cause the apparatus at least to: receive, from a first terminal device, a positioning reference signal (PRS) along with capability information indicating a capability of the first terminal device to provide location information of the first terminal device; determine, based on the capability information, that the first terminal device transmits the PRS without the location information and has the capability to provide the location information; and transmit, to the first terminal device, a request for the location information of the first terminal device.

In a tenth aspect, a first terminal device is provided. The first terminal device comprises transmitting circuitry configured to transmit capability information of the first terminal device along with a positioning reference signal (PRS), wherein the capability information indicates a capability to provide the location information of the first terminal device; receiving circuitry configured to receive, from a second terminal device, a request for the location information of the first terminal device; and transmitting circuitry configured to based on receiving the request, transmit the location information along with a subsequent PRS.

In an eleventh aspect, a second terminal device is provided. The second terminal device comprises receiving circuitry configured to receive, from a first terminal device, a positioning reference signal (PRS) along with capability information indicating a capability of the first terminal device to provide location information of the first terminal device; determining circuitry configured to determine, based on the capability information, that the first terminal device transmits the PRS without the location information and has the capability to provide the location information; and transmitting circuitry configured to transmit, to the first terminal device, a request for the location information of the first terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
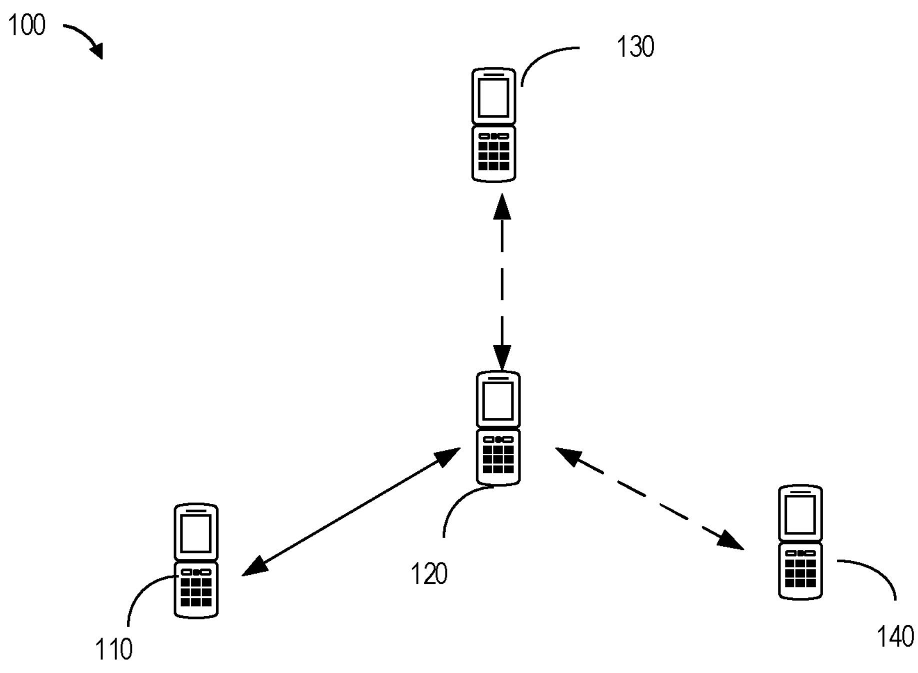
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

3GPP radio access network (RAN) conducted a study on "Scenarios and requirements of in-coverage, partial coverage, and out-of-coverage NR positioning use cases" in Release-17 focused on V2X and public safety use cases with the outcome being captured in TR38.845. Additionally, SA1 has developed requirements in TS22.261 for "Ranging based services", and has developed positioning accuracy requirements in TS22.104 for IIoT use cases in out-of-coverage scenarios. Furthermore, the positioning requirements are captured via key-performance-indices (KPIs) such as:

- horizontal and vertical accuracy, where vertical accuracy refers to accuracy in altitude and determines the floor for indoor use cases and to distinguish between superposed tracks for road and rail use cases (e.g. bridges).
- positioning service availability: percentage value of the amount of time the positioning service is delivering the required position-related data within the performance requirements, divided by the amount of time the system is expected to deliver the positioning service according to the specification in the targeted service area.
- positioning service latency: time elapsed between the event that triggers the determination of the position-related data and the availability of the position-related data at the system interface.
- time to first fix (TTFF): time elapsed between the event triggering for the first time the determination of the position-related data and the availability of the position-related data at the positioning system interface.
- update rate.
- Energy consumption, etc.

TS22.261 lists the performance requirements for different positioning service levels. It is noted that, along with horizontal and vertical accuracy requirements, the requirements on positioning service availability and positioning service latency are particularly very stringent for positioning service levels 4 (99.9% availability and 15 ms latency) and 6 (99.9% availability and 10 ms latency). The examples of scenarios/use cases of positioning service levels 4 and 6 include:

- V2X, set-2 and set-3 use cases: This corresponds to, in RP-210040, 'Group 2: Lane level positioning requirement' use cases such as vehicle platooning, cooperative lane merge, lane change warning, emergency break warning, intersection movement assist, etc., and 'Group 3: Below meter positioning requirement' use cases such as high definition sensor sharing, vulnerable road user (VUR)—collision risk warning, cooperative manoeuvers in emergency situations, real-time situation awareness and high-definition maps, etc.
- IIoT: Factories of the Future scenarios such as augmented reality in smart factories, mobile control panels with safety functions in smart factories (within factory danger zones), inbound logistics for manufacturing (for driving trajectories (if supported by further sensors like camera, GNSS, IMU) of indoor autonomous driving systems)).

Two types of SL positioning are being considered:

- Session-based: conventional approach where the location estimate is obtained by a "time-limited two-way link enabling interactive expression and information exchange between two or more communication devices, typically in presence of state (i.e., information about session history).";
- Session-less: key characteristic of session-less positioning, however, is potentially the absence of anchor UE discovery procedure, as well as no specific anchor UE association and no SL positioning protocol (SLPP) session.

Below is a list of related terminologies.

Target UE: UE to be positioned (in this context, using SL, i.e., PC5 interface).

Anchor UE: UE supporting positioning of target UE, e.g., by transmitting and/or receiving reference signals for positioning, providing positioning-related information, etc., over the SL interface.

Sidelink positioning: Positioning UE using reference signals transmitted over SL, i.e., PC5 interface, to obtain absolute position, relative position, or ranging information.

Ranging: Determination of the distance and/or the direction between a UE and another entity, e.g., anchor UE.

Sidelink positioning reference signal (SL PRS): Reference signal transmitted over SL for positioning purposes.

SL PRS (pre-)configuration: (Pre-)configured parameters of SL PRS such as time-frequency resources (other parameters are not precluded) including its bandwidth and periodicity.

SL positioning is based on transmissions of sidelink positioning reference signal (SL PRS) by multiple anchor UEs to be received by a target UE in e.g. SL TDOA methods or SL PRS exchange between the anchor UE(s) and target UEs in e.g. SL (multi-) RTT method. SL positioning enables localization of the target UE and/or ranging of target UE with respect to a reference UE (e.g. anchor UE) within precise latency and accuracy requirements of the corresponding SL positioning.

SL positioning is defined as positioning of a target UE using SL PRS (reference signals transmitted over SL, i.e., PC5 interface) to obtain absolute position, relative position, or ranging information. Hence, an anchor UE may be transmitting SL PRS to assist the target UE in either absolute positioning, relative positioning or ranging. Note that the absolute location (referred as location for short henceforth) of the anchor UEs is needed only in case of absolute positioning of the target UE, and hence only those anchor UEs which are involved in absolute positioning of the target UE may send their location along with the SL PRS transmission. On the other hand, the anchor UEs involved in relative positioning or ranging may transmit only SL PRS and not their location information along with the SL PRS. In addition, in case of network-based (UE-assisted) SL absolute positioning where the LMF computes the location of target UE based on SL PRS measurements provided by the target UE, the anchor UEs may not transmit the location information on SL.

Consider a SL positioning scenario where a target UE is in need of performing absolute positioning in a session-less manner, and at least some of the anchor UEs in the vicinity are involved in relative positioning or ranging i.e. transmitting only SL PRS without the associated location information. In this scenario, not all the SL PRS received at the target UE are useful in its absolute positioning since some of the SL PRS (i.e. SL PRS associated with ranging and relative positioning) do not have the associated location information of the anchor even if the reception quality of those SL PRS is good.

Hence, there may be insufficient number of SL PRS to support absolute positioning of a session-less target UE. This may reduce positioning accuracy of the session-less target UE. In addition, SL PRS resource utilization is reduced since such SL PRS cannot be used by session-less target UEs. On the other hand, each anchor UE which is aware of its own location and involved in ranging or relative positioning blindly transmitting location information along with SL PRS may not be resource efficient since there may not be session-less target UEs in the vicinity that can benefit from the additional location information.

According to some embodiments of the present disclosure, a solution is provided for SL positioning. In this solution, a first terminal device transmits capability information of the first terminal device along with a positioning reference signal (PRS), and the capability information indicates a capability to provide the location information of the first terminal device. Then the first terminal device receives a request for the location information of the first terminal device from a second terminal device. Based on receiving the request, the first terminal device transmits the location information along with a subsequent PRS. As such, in embodiments of the present disclosure, the first terminal device may transmit location information according to the request of the second terminal device. Thereby the problem of insufficient SL PRS transmissions supporting absolute positioning, along with that of resource inefficiency of blind location information transmission by anchor UEs is addressed by means of a solution framework that attains location information transmission when and where needed.

The proposed solution improves SL positioning performance (e.g., accuracy) of session-less target UEs by increasing the availability of SL PRS that has associated anchor location information. Also, it increases utilization of SL PRS involved in ranging and/or relative positioning since, in addition to their intended use in ranging and/or relative positioning, those SL PRS can also be used at the session-less target UEs for absolute positioning.

Example embodiments of the present disclosure for SL positioning will be described below with reference to FIG. 1-FIG. 7. FIG. 1 illustrates an example network environment 100 in which example embodiments of the present disclosure may be implemented. The environment 100, which may be a part of a communication network, comprises terminal devices and network devices.

As illustrated in FIG. 1, the communication network 100 may comprise a second terminal device 120 (hereinafter may also be referred to as UE 120 or a target UE 120), a first terminal device 110 (hereinafter may also be referred to as UE 110 or an anchor UE 110), a third terminal device 130 (hereinafter may also be referred to as UE 130 or an anchor UE 130) and a fourth terminal device 140 (hereinafter may also be referred to as UE 140 or an anchor UE 140). A link from the second terminal device 120 to the first terminal device 110, the third terminal device 130 and the fourth terminal device 140 is referred to as an sidelink (SL). The second terminal device 120 can communicate with the first terminal device 110, the third terminal device 130 and the fourth terminal device 140 via the SL.

In some embodiments, a target UE 120 is performing SL positioning by receiving SL PRS from the three anchor UEs (the first terminal device 110, the third terminal device 130 and the fourth terminal device 140) and determining its location using SL TDOA method. Here, the anchor UEs are said to provide SL PRS assistance (include SL PRS) to the target UE. Furthermore, in in-coverage scenarios, the location management function (LMF) may coordinate the SL positioning where the SL PRS transmissions from anchor UEs may be configured by the LMF.

It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the environment 100.

Communications in the network environment 100 may be implemented according to any proper communication protocol(s), comprising, but not limited to, the third generation (3G), the fourth generation (4G), the fifth generation (5G) or 5G beyond, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figure 2:
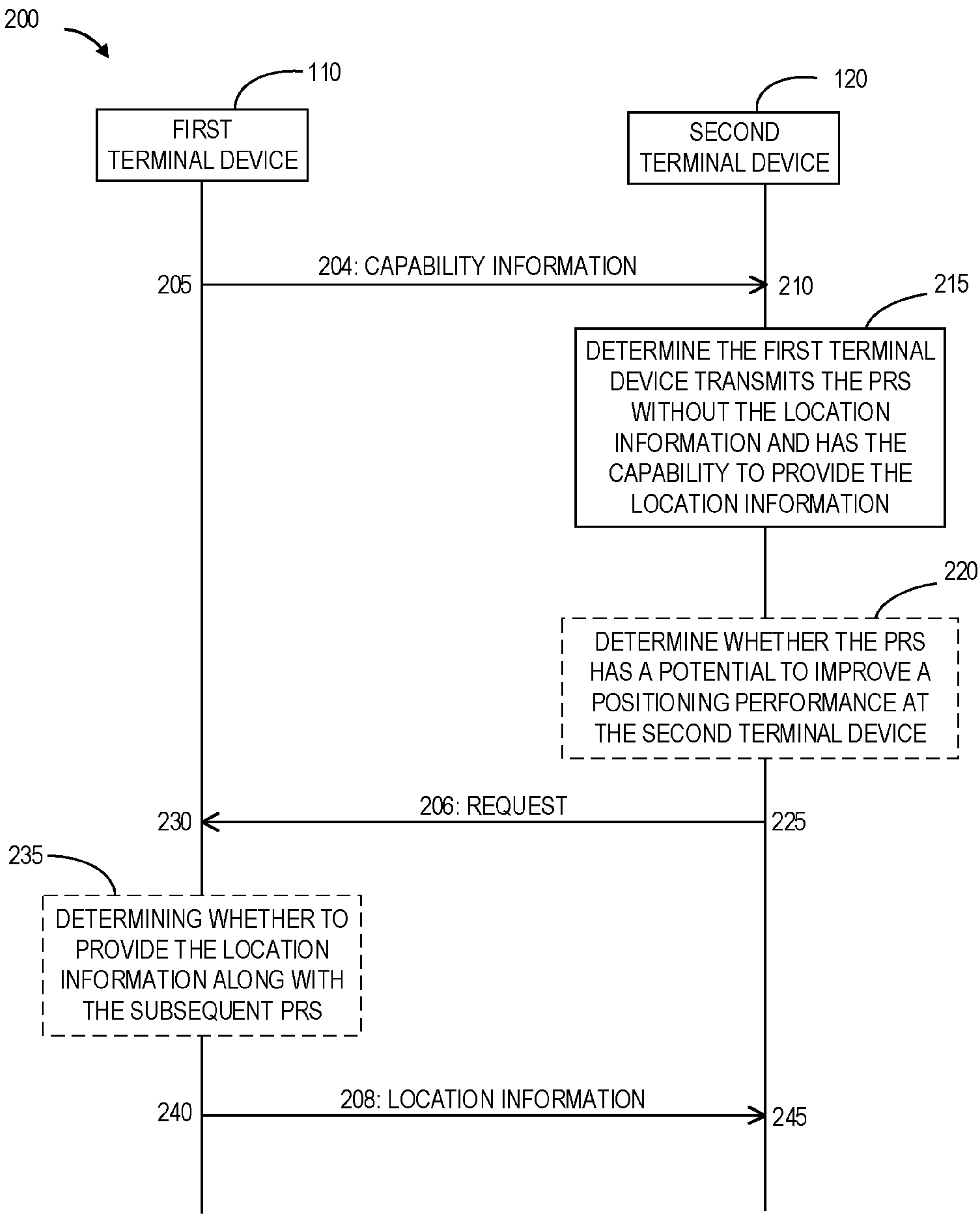
FIG. 2 illustrates an example signaling chart illustrating an example process according to some embodiments of the present disclosure.

FIG. 2 illustrates an example signaling chart illustrating an example process 200 according to some embodiments of the present disclosure. For the purpose of discussion, the process 200 will be described with reference to FIG. 1. The process 200 may involve the first terminal device 110, the second terminal device 120. It would be appreciated that although the process 200 has been described in the communication environment 100 of FIG. 1, this process 200 may be likewise applied to other communication scenarios with similar issues.

In the process 200, the first terminal device 110 transmits 205 capability information 204 of the first terminal device 110 along with a positioning reference signal (PRS). The capability information 204 indicates a capability to provide the location information of the first terminal device.

For example, an anchor UE that is currently not transmitting its location information along with its SL PRS but has the ability to provide location information (e.g. location-aware anchor UEs involved in ranging, relative positioning and/or network-based SL absolute positioning) broadcasts an indication whether or not it has the ability to provide its location information along with SL PRS.

In some embodiments, the capability information may comprise: one-bit indicator indicating whether the first terminal device has the capability to provide the location information, an uncertainty of the location information, or any combination of two of the above-mentioned items.

In some embodiments, the capability information may be transmitted via sidelink control information (SCI) associated with the PRS. The capability information may also be broadcasted to the second terminal device. In addition, the capability information may be groupcasted to the second terminal device.

After receiving 210 the PRS along with the capability information 204 from the first terminal device 110, the second terminal device 120 determines 215 that the first terminal device transmits the PRS without the location information and has the capability to provide the location information.

For example, based on the indication of the capability information, a target UE monitors SL PRS and identifies the anchors that are transmitting SL PRS without the associated anchor location information but have the ability to provide anchor location information.

In some embodiments, in order to transmit the request, the second terminal device 120 may determine 220 whether the PRS has a potential to improve a positioning performance at the second terminal device. Based on determining the PRS has the potential to improve the positioning performance at the second terminal device, the second terminal device 120 may transmit the request for the location information of the first terminal device.

In some embodiments, in order to determine whether the PRS has the potential to improve the positioning performance at the second terminal device, the following conditions may be satisfied: a RSRP of the PRS of the first terminal device measured at the second terminal device is above a first threshold; a relative angle of arrival of the PRS at the second terminal device lies within an azimuth or a vertical angular range; a hard-valued LOS-NLOS-indicator of the PRS indicates a LOS link between the first terminal device and the second terminal device; a value of the soft-valued LOS/NLOS indicator of the PRS is above a second threshold; or any combination of two or more of the above-mentioned items.

Then the second terminal device 120 transmits 225 a request 206 for the location information of the first terminal device 110 to the first terminal device 110.

For example, a target UE requests one or more of the identified anchors to provide location information along with SL PRS. Note that the target UE does not get into SL positioning session with the anchor UEs, but merely requests the anchor UEs to include location information. It is up to anchor UEs where or not to consider target UEs request.

In some embodiments, the request 206 may comprise: a list of at least one terminal device from which the second terminal device needs location information; a reference signal received power (RSRP) measurement by the second terminal device of a PRS transmitted by the first terminal device; an achieved accuracy performance of the positioning of the second terminal device; a requirement of accuracy performance of the positioning of the second terminal device; a line of sight (LOS)-non-line of sight (NLOS)-indicator measured for the at least one terminal device, and the LOS-NLOS-indicator comprises at least one of a hard-valued LOS-NLOS-indicator or a soft-valued LOS-NLOS-indicator; a number of the at least one terminal device that is available for absolute positioning of the second terminal device; an indication of at least one terminal device and the location information of the at least one terminal device, and the location information of the least one terminal device is used by the second terminal device; a request information for requesting the uncertainty of the location information; a range for an accepted uncertainty of the location information; or any combination of two or more of the above-mentioned items.

In some embodiments, the request may be broadcasted to the first terminal device. The request may also be unicasted to the first terminal device. In addition, the request may be groupcasted to the first terminal device.

In some embodiments, after receiving 230 the request 206 from the second terminal device 120, the first terminal device 110 may determine 235 whether to provide the location information along with the subsequent PRS.

In some embodiments, in order to determine whether to provide the location information along with the subsequent PRS, the following conditions may be satisfied: the request is received from the second terminal device; an identifier (ID) of the first terminal device is comprised in the list; an RSRP of the first terminal device measured at the second terminal device is above a first threshold; the first terminal device has a potential to improve a positioning performance at the second terminal device, and the potential is evaluated based on at least one terminal device and location information of the at least one terminal device, and the location information of the least one terminal device is used by the second terminal device; the achieved accuracy performance of the positioning of the second terminal device is below an accuracy requirement of the second terminal device; the uncertainty of the location information lies within the range of the accepted uncertainty; the hard-valued LOS-NLOS-indicator indicates a LOS link between the first terminal device and the second terminal device; a value of the soft-valued LOS-NLOS-indicator is above a second threshold; or any combination of two or more of the above-mentioned items.

Referring back to the FIG. 2, the first terminal device 110 transmits 240 the location information 208 along with the subsequent PRS.

For example, upon receiving the request from target UE, the anchor UE includes its location information along with its SL PRS transmissions.

In some embodiments, based on determining 235 to provide the location information 208 along with the subsequent PRS, the first terminal device 110 may transmit 240 the location information 208 along with the subsequent PRS.

On the other side of the communication, the second terminal device 120 receives 245 the location information of the first terminal device along with a subsequent PRS from the first terminal device 110.

For example, the target UE receives anchor location information along SL PRS transmission from one or more of the requested anchor UEs, and it utilizes the location information and the SL PRS in its session-less absolute positioning.

In an embodiment, the target UE and anchor UE behavior may be configured as below:

The target UE is configured to:

Receive SL PRS and associated SL positioning data (if any) from anchor UEs;

Receive location capability information from anchor UE(s) that is currently not transmitting its location information in SL positioning data along with its SL PRS;

Identify anchor UEs that are transmitting SL PRS without the associated anchor location information but have the ability to provide anchor location information based on at least the received location capability information;

In addition, whether SL PRS has the potential to improve SL positioning performance at the target UE may also be considered.

Send request to include UE anchor location to one or more of the identified anchor UEs to request to include location information in SL positioning data along with SL PRS transmissions;

Receive SL PRS and location information in SL positioning data from one or more of the requested anchor UEs;

Perform absolute positioning in a session-less manner using at least the received SL PRS and the associated anchor location information.

The anchor UE (that is performing SL ranging, SL relative positioning, and/or network-based SL absolute positioning) is configured to:

Send SL PRS for SL ranging, SL relative positioning, and/or network-based SL absolute positioning;

Send location capability information along with SL PRS when it is not transmitting its location information in SL positioning data along with its SL PRS;

Receive request to include anchor UE location request from one or more target UEs to include anchor location information in SL positioning data even in case of ranging, relative positioning, and/or network-based SL absolute positioning;

Determine whether to include anchor location information along with SL PRS transmission even when performing ranging, relative positioning and/or network-based SL absolute positioning based on at least the request to include anchor UE location;

Transmit SL positioning data with anchor location information along with SL PRS transmission even when performing ranging, relative positioning and/or network-based SL absolute positioning based on the determination.

Figure 3:
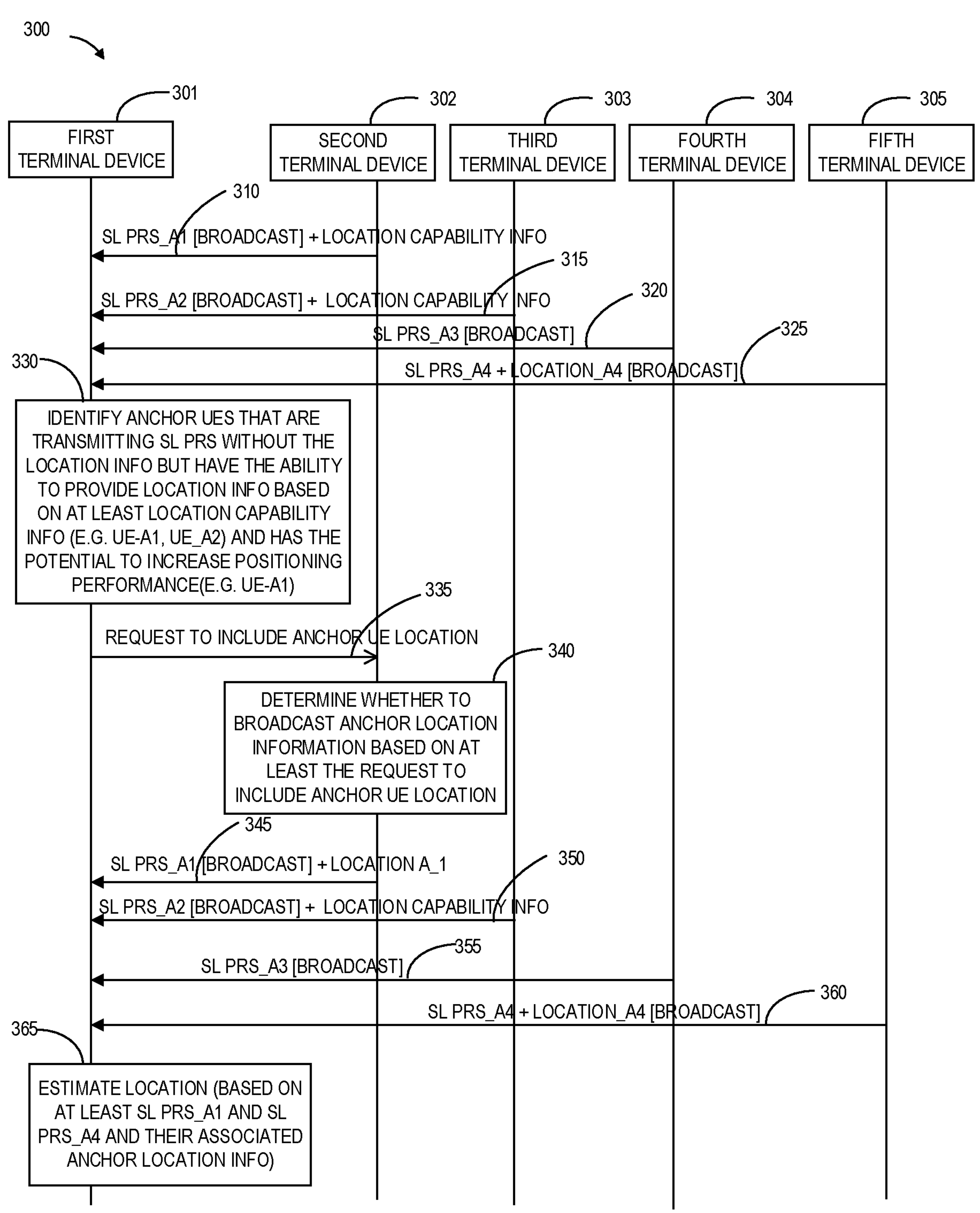
FIG. 3 illustrates an example process according to some embodiments of the present disclosure.

FIG. 3 illustrates an example process 300 according to some embodiments of the present disclosure. The process 300 may involve the first terminal device 301, a second terminal device 302, a third terminal device 303, a fourth terminal device 304 and a fifth terminal device 305. It is understood that the process 300 can be considered as a more specific example of the process 200 in FIG. 2. Thus, the first terminal device 301 in FIG. 3 may be an example of the terminal device 120 in FIG. 1 or 2 and the second terminal device 302 in FIG. 3 may be an example of the terminal device 110 in FIG. 1 or 2.

The first terminal device 301 is a session-less target UE which does not intend to conduct any session-based interaction with anchor UEs in the vicinity (i.e. the first terminal device 301 does not intend to be in session with any anchor UE), but monitors SL PRS and the associated SL positioning data with location information transmitted from them to position itself (absolute positioning) in a session-less and UE-based (i.e. position computed at the UE) manner.

Consider the second terminal device 302, the third terminal device 303 and the fourth terminal device 304 are involved in different SL ranging (and/or relative positioning and/or network-based SL absolute positioning) sessions with certain target UEs. As part of their respective ranging sessions, they are transmitting SL PRS. Since they are not involved in UE-based absolute positioning, they are not sending their location information along with the SL PRS transmission.

Furthermore, the second terminal device 302 and the third terminal device 303 are assumed to be aware of their location, however the fourth terminal device 304 is not aware of its location. Let the fifth terminal device 305 be an anchor UE that is involved in a session-based SL absolute positioning session and/or let the fifth terminal device 305 be acting as an anchor UE to support session-less target UEs in the vicinity for absolute positioning. Hence, the fifth terminal device 305 is assumed to be sending its location information along with its SL PRS transmission.

The first terminal device 301 receives SL PRS and associated SL positioning data (if any) from anchor UEs. In addition, the first terminal device 301 also receives location capability info message from anchor UEs (the second terminal device 302 and the third terminal device 303) that are currently not transmitting their location information in SL positioning data along with its SL PRS but have the ability to provide anchor location information.

As shown in FIG. 3, the second terminal device 302 broadcasts 310 SL PRS_A1 and location capability information to the first terminal device 301. The third terminal device 303 broadcasts 315 SL PRS_A2 and location capability information to the first terminal device 301. The fourth terminal device 304 broadcasts 320 SL PRS_A3 to the first terminal device 301. The fifth terminal device 305 broadcasts 325 SL PRS_A4 and location A4 to the first terminal device 301.

In some embodiments, the location capability may be a 1-bit indicator which indicates whether or not the anchor UE has the ability to provide location information.

In some embodiments, the location capability may include further information besides the binary one, including the uncertainty of the anchor UE's estimated location. For example, anchor UEs with location capability but with low uncertainty can be used only for (absolute) positioning applications at target which however have relaxed (target) UE accuracy requirements.

In some embodiments, the location capability may be sent in sidelink control information (SCI) (e.g., 2nd stage SCI) associated with the respective SL PRS.

In some embodiments, the location capability may be broadcasted or groupcasted to a dedicated group of potential target UEs.

Referring back to the FIG. 3, the first terminal device 301 identifies 330 anchor UEs that are transmitting SL PRS without the associated anchor location information but have the ability to provide anchor location information based on at least the received location capability info (the second terminal device 302 and the third terminal device 303). In addition, whether SL PRS has the potential to improve SL positioning performance at the target UE may also be considered.

In some embodiments, in order to determine which anchor UEs the first terminal device 301 must approach for location information, the first terminal device 301 may identify anchor UEs for which the SL PRS RSRP measured at the first terminal device 301 is above a certain threshold.

In some embodiments, in order to determine which anchor UEs the first terminal device 301 must approach for location information, the first terminal device 301 may identify anchor UEs for which the relative angle of arrival (based on the measured SL PRS) at the first terminal device 301 lies within certain azimuth or vertical angular ranges.

In some embodiments, in order to determine which anchor UEs the first terminal device 301 must approach for location information, the first terminal device 301 may identify anchor UEs for which the measured soft-valued LOS/NLOS indicator of one or more SL PRS resources is above a certain threshold or the hard-valued LOS/NLOS indicator indicates LOS.

After identifying the anchor UEs, the first terminal device 301 sends 335 request to include anchor UE location information to one or more of the identified anchor UEs (the second terminal device 302) to request to include location information in SL positioning data along with SL PRS transmissions.

In some embodiments, the request to include anchor UE location may contain the list of anchor UEs from which the first terminal device 301 needs location information.

In some embodiments, the request to include anchor UE location may further contain:

- RSRP measured for one or more of identified anchor UE positioning accuracy requirement and currently achieved accuracy performance at the first terminal device 301;
- LOS/NLOS indicator (soft/hard-valued) measured for one or more of identified anchor UE;
- number of anchor UEs that are currently available for absolute positioning (i.e. number of SL PRS with associated location information and at least RSRP being above a certain threshold).
- Currently used anchor UEs and their location In some embodiments, the request to include anchor UE location may further contain a request to acquire the anchor UE's location uncertainty.

In some embodiments, the request to include anchor UE location may further contain the range of the accepted anchor location uncertainty, such that if the uncertainty is above out of this range the anchor UE should back off from providing its location information.

In some embodiments, the request to include anchor UE location may be broadcasted. In some embodiments, the request to include anchor UE location may be unicasted to the designated anchor UE. In some embodiments, the request to include anchor UE location may be groupcasted to a group of designated anchors.

Upon receiving request to include anchor UE location information, the second terminal device 302 determines whether to include anchor location information along with SL PRS transmission even when performing ranging, relative positioning and/or network-based SL absolute positioning based on at least the request to include anchor UE location.

In some embodiments, in order to determine whether to include anchor location information, the second terminal device 302 may determine to include anchor location in SL positioning data along with its SL PRS whenever it receives request to include anchor UE location from a target UE.

In some embodiments, in order to determine whether to include anchor location information, the second terminal device 302 may determine to include anchor location in SL positioning data along with its SL PRS if its anchor ID is listed in request to include anchor UE location (i.e. when the first terminal device 301 explicitly indicates that it needs location info from the second terminal device 302).

In some embodiments, in order to determine whether to include anchor location information, the second terminal device 302 may determine to include anchor location in SL positioning data along with its SL PRS only when RSRP measured at the first terminal device 301 for the second terminal device 302 (indicated in request to include anchor UE location) is above a certain threshold.

In some embodiments, in order to determine whether to include anchor location information, the second terminal device 302 may determine to include anchor location in SL positioning data along with its SL PRS if the second terminal device 302 has the potential to improve geometric dilution of precision (GDOP) performance at the first terminal device 301, where the potential is evaluated based on the currently used anchor UEs at the first terminal device 301 and their location (indicated in request to include anchor UE location).

In some embodiments, in order to determine whether to include anchor location information, the second terminal device 302 may determine to include anchor location in SL positioning data along with its SL PRS if the first terminal device 301's positioning accuracy performance is not able to meet its positioning accuracy requirement (indicated in request to include anchor UE location).

In some embodiments, in order to determine whether to include anchor location information, the second terminal device 302 may determine to include anchor location in SL positioning data along with its SL PRS if the required uncertainty on the anchor UE's location lies within the designated range.

In some embodiments, in order to determine whether to include anchor location information, the second terminal device 302 may determine to include anchor location in SL positioning data along with its SL PRS if the measured hard-valued LOS/NLOS indicator indicates LOS link between the first terminal device 301 and the second terminal device 302 or the measured soft-valued LOS/NLOS indicator indicated in request to include anchor UE location) is above a certain threshold.

Assuming positive determination is made, the second terminal device 302 broadcasts 345 SL positioning data with anchor location information along with SL PRS transmission even when performing ranging, relative positioning and/or network-based SL absolute positioning.

UE behaviors of the third terminal device 303, the fourth terminal device 304 and the fifth terminal device 305 remain same as before. The third terminal device 303 broadcasts 350 SL PRS_A2 and location capability information to the first terminal device 301. The fourth terminal device 304 broadcasts 355 SL PRS_A3 to the first terminal device 301. The fifth terminal device 305 broadcasts 360 SL PRS_A4 and location A4 to the first terminal device 301.

Then the first terminal device 301 estimates 365 location based on at least SL PRS_A1 and SL PRS_A4 and their associated anchor location information. For example, the first terminal device 301 performs absolute positioning in a session-less manner using at least the received SL PRS and the associated anchor location information.

In an embodiment, instead of directly requesting the anchor UE for location information, the first terminal device 301 requests the LMF (or server UE) which then in turn configures the anchor UE (the second terminal device 302) to include the location information.

In general, anchor UEs that support UEs in ranging or relative positioning transmit SL PRS. However, along with SL PRS, they may not send anchor location information since anchor location may not be of interest to their intended target UEs in ranging or relative positioning. Also, in case of network-based (UE-assisted) SL absolute positioning where the LMF computes the location of target UE based on SL PRS measurements provided by the target UE, the anchors may not transmit the location information on SL. However, utilization of SL PRS that is being transmitted as part of ranging, relative positioning, and/or network-based SL absolute positioning session can be increased if anchor location (when known at the anchor UE) can be transmitted along with the SL PRS to support third session-less target UE in absolute positioning, even though it is not of interest to their own target UEs in their ranging or relative positioning. However, always transmitting location information from such anchor UEs is inefficient since there may not always be session-less target UEs in the vicinity.

To this end, a scheme is proposed where an anchor UE that is involved in ranging, relative positioning and/or network-based SL absolute positioning (i.e. anchor UE is transmitting only SL PRS and not anchor location information) broadcasts an indication whether or not it is has the ability to provide its location information along with SL PRS. Based on this indication and SL PRS, a session-less target UE identifies one or more anchor UEs which are currently not sending their anchor location information, however has the ability to provide the location information and together with location information their SL PRS have the potential to increase absolute positioning performance (e.g. accuracy) at the target UE. Then, target UE sends a request message to the identified anchor UEs to include anchor location information along with SL PRS transmission(s) so that it can perform SL absolute positioning with e.g. higher accuracy.

Figure 4:
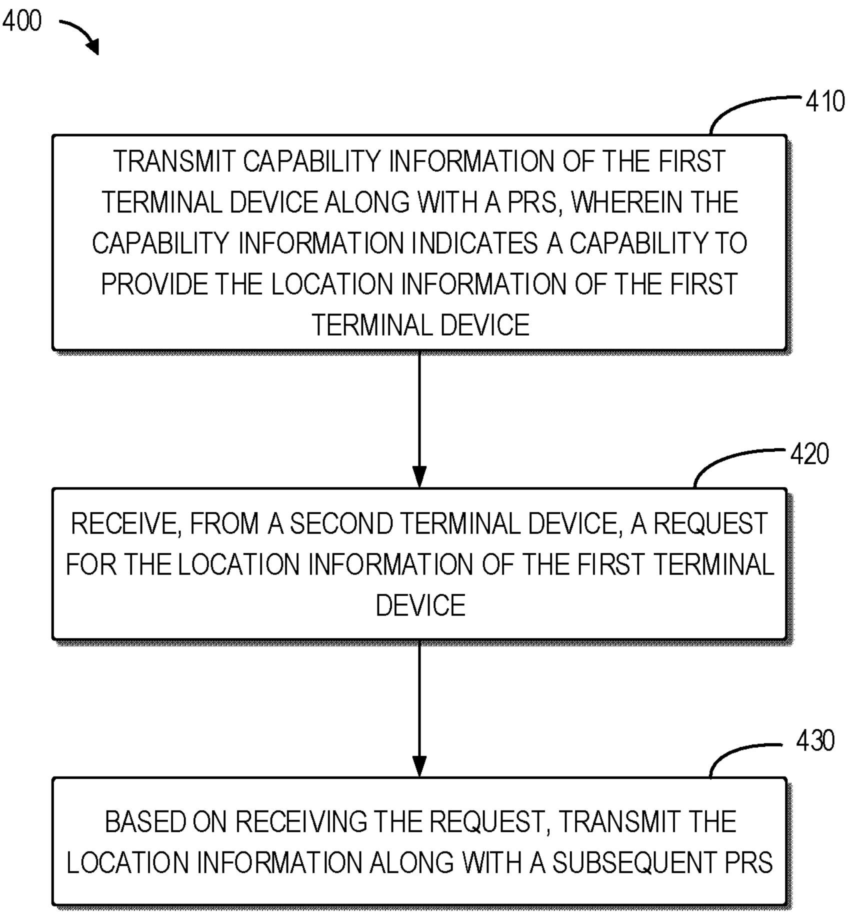
FIG. 4 illustrates a flowchart of a method implemented at a first terminal device according to some embodiments of the present disclosure.

FIG. 4 illustrates a flowchart of method 400 implemented at the first terminal device 110 according to some embodiments of the present disclosure. For the purpose of discussion, method 400 will be described from the perspective of the first terminal device 110 with reference to FIG. 1. It is to be understood that method 400 may further include additional blocks not shown and/or omit some shown blocks, and the scope of the present disclosure is not limited in this regard.

At block 410, the first terminal device 110 transmits capability information of the first terminal device along with a positioning reference signal (PRS). The capability information indicates a capability to provide the location information of the first terminal device. At block 420, the first terminal device 110 receives a request for the location information of the first terminal device from a second terminal device. At block 430, based on receiving the request, the first terminal device 110 transmits the location information along with a subsequent PRS.

In some embodiments, the capability information may comprise: one-bit indicator indicating whether the first terminal device has the capability to provide the location information, an uncertainty of the location information, or any combination of two of the above-mentioned items.

In some embodiments, the request may comprise: a list of at least one terminal device from which the second terminal device needs location information; a reference signal received power (RSRP) measurement by the second terminal device of a PRS transmitted by the first terminal device; an achieved accuracy performance of the positioning of the second terminal device; a requirement of accuracy performance of the positioning of the second terminal device; a line of sight (LOS)-non-line of sight (NLOS)-indicator measured for the at least one terminal device, and the LOS-NLOS-indicator comprises at least one of a hard-valued LOS-NLOS-indicator or a soft-valued LOS-NLOS-indicator; a number of the at least one terminal device that is available for absolute positioning of the second terminal device; an indication of at least one terminal device and the location information of the at least one terminal device, and the location information of the least one terminal device is used by the second terminal device; a request information for requesting the uncertainty of the location information; a range for an accepted uncertainty of the location information; or any combination of two or more of the above-mentioned items.

In some embodiments, in order to transmit the location information, the first terminal device 110 may determine whether to provide the location information along with the subsequent PRS. Based on determining to provide the location information along with the subsequent PRS, the first terminal device 110 may transmit the location information along with the subsequent PRS.

In some embodiments, in order to determine whether to provide the location information along with the subsequent PRS, the following conditions may be satisfied: the request is received from the second terminal device; an identifier (ID) of the first terminal device is comprised in the list; an RSRP of the first terminal device measured at the second terminal device is above a first threshold; the first terminal device has a potential to improve a positioning performance at the second terminal device, and the potential is evaluated based on at least one terminal device and location information of the at least one terminal device, and the location information of the least one terminal device is used by the second terminal device; the achieved accuracy performance of the positioning of the second terminal device is below an accuracy requirement of the second terminal device; the uncertainty of the location information lies within the range of the accepted uncertainty; the hard-valued LOS-NLOS-indicator indicates a LOS link between the first terminal device and the second terminal device; a value of the soft-valued LOS-NLOS-indicator is above a second threshold; or any combination of two or more of the above-mentioned items.

In some embodiments, the capability information may be transmitted via sidelink control information (SCI) associated with the PRS. The capability information may also be broadcasted to the second terminal device. In addition, the capability information may be groupcasted to the second terminal device.

In some embodiments, the request may be broadcasted to the first terminal device. The request may also be unicasted to the first terminal device. In addition, the request may be groupcasted to the first terminal device.

Figure 5:
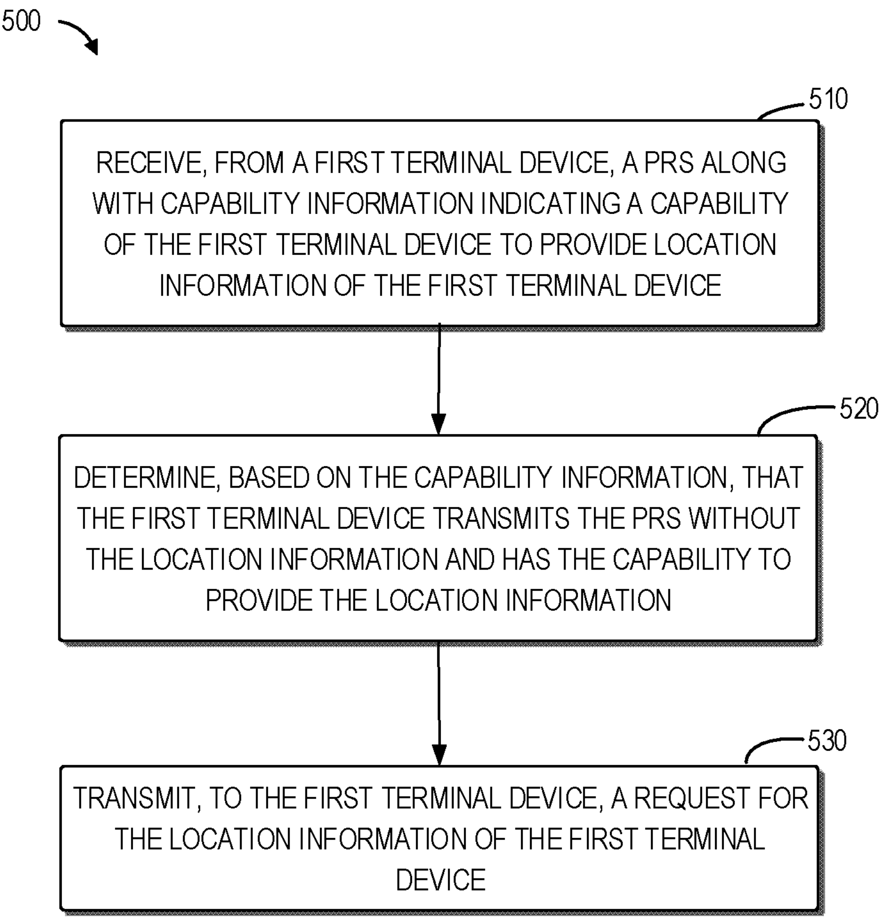
FIG. 5 illustrates a flowchart of a method implemented at a second terminal device according to some other embodiments of the present disclosure.

FIG. 5 illustrates a flowchart of a method 500 implemented at the second terminal device 120 in accordance with some embodiments of the present disclosure. For the purpose of discussion, the method 500 will be described from the perspective of the second terminal device 120 with reference to FIG. 1. It is to be understood that method 500 may further include additional blocks not shown and/or omit some shown blocks, and the scope of the present disclosure is not limited in this regard.

At block 510, the second terminal device 120 receives a positioning reference signal (PRS) along with capability information from the first terminal device 110. The capability information indicates a capability of the first terminal device to provide location information of the first terminal device. At block 520, based on the capability information, the second terminal device 120 determines that the first terminal device transmits the PRS without the location information and has the capability to provide the location information. At block 530, the second terminal device 120 transmits a request for the location information of the first terminal device to the first terminal device.

In some embodiments, the capability information may comprise: one-bit indicator indicating whether the first terminal device has the capability to provide the location information, an uncertainty of the location information, or any combination of two of the above-mentioned items.

In some embodiments, the request may comprise: a list of at least one terminal device from which the second terminal device needs location information; a reference signal received power (RSRP) measurement by the second terminal device of a PRS transmitted by the first terminal device; an achieved accuracy performance of the positioning of the second terminal device; a requirement of accuracy performance of the positioning of the second terminal device; a line of sight (LOS)-non-line of sight (NLOS)-indicator measured for the at least one terminal device, and the LOS-NLOS-indicator comprises at least one of a hard-valued LOS-NLOS-indicator or a soft-valued LOS-NLOS-indicator; a number of the at least one terminal device that is available for absolute positioning of the second terminal device; an indication of at least one terminal device and the location information of the at least one terminal device, and the location information of the least one terminal device is used by the second terminal device; a request information for requesting the uncertainty of the location information; a range for an accepted uncertainty of the location information; or any combination of two or more of the above-mentioned items.

In some embodiments, in order to transmit the request, the second terminal device 120 may determine whether the PRS has a potential to improve a positioning performance at the second terminal device. Based on determining the PRS has the potential to improve the positioning performance at the second terminal device, the second terminal device 120 may transmit the request for the location information of the first terminal device.

In some embodiments, in order to determine whether the PRS has the potential to improve the positioning performance at the second terminal device, the following conditions may be satisfied: a RSRP of the PRS of the first terminal device measured at the second terminal device is above a first threshold; a relative angle of arrival of the PRS at the second terminal device lies within an azimuth or a vertical angular range; a hard-valued LOS-NLOS-indicator of the PRS indicates a LOS link between the first terminal device and the second terminal device; a value of the soft-valued LOS/NLOS indicator of the PRS is above a second threshold; or any combination of two or more of the above-mentioned items.

In some embodiments, the capability information may be received via SCI, associated with the PRS. The capability information may also be broadcasted from the first terminal device. In addition, the capability information may be groupcasted from the first terminal device.

In some embodiments, the request may be broadcasted to the first terminal device. The request may also be unicasted to the first terminal device. In addition, the request may be groupcasted to the first terminal device.

In some embodiments, the second terminal device 120 may receive the location information of the first terminal device along with a subsequent PRS from the first terminal device.

In some embodiments, an apparatus capable of performing any of the method 400 (for example, the terminal device 110) is provided. The apparatus may comprise means for performing the respective steps of the method 400. The means may be implemented in any suitable form. For example, the means may be implemented in a circuitry or software module.

In some embodiments, the apparatus comprises: means for transmitting, at a first terminal device, capability information of the first terminal device along with a positioning reference signal (PRS), wherein the capability information indicates a capability to provide the location information of the first terminal device; means for receiving, from a second terminal device, a request for the location information of the first terminal device; and means for based on receiving the request, transmitting the location information along with a subsequent PRS.

In some embodiments, the capability information may comprise: one-bit indicator indicating whether the first terminal device has the capability to provide the location information, an uncertainty of the location information, or any combination of two of the above-mentioned items.

In some embodiments, the request may comprise: a list of at least one terminal device from which the second terminal device needs location information; a reference signal received power (RSRP) measurement by the second terminal device of a PRS transmitted by the first terminal device; an achieved accuracy performance of the positioning of the second terminal device; a requirement of accuracy performance of the positioning of the second terminal device; a line of sight (LOS)-non-line of sight (NLOS)-indicator measured for the at least one terminal device, wherein the LOS-NLOS-indicator comprises at least one of a hard-valued LOS-NLOS-indicator or a soft-valued LOS-NLOS-indicator; a number of the at least one terminal device that is available for absolute positioning of the second terminal device; an indication of at least one terminal device and the location information of the at least one terminal device, wherein the location information of the least one terminal device is used by the second terminal device; a request information for requesting the uncertainty of the location information; a range for an accepted uncertainty of the location information; or any combination of two or more of the above-mentioned items.

In some embodiments, the means for transmitting the location information comprises: means for determining whether to provide the location information along with the subsequent PRS; and means for based on determining to provide the location information along with the subsequent PRS, transmitting the location information along with the subsequent PRS.

In some embodiments, the means for determining whether to provide the location information along with the subsequent PRS comprises means for determining: the request is received from the second terminal device; an identifier (ID) of the first terminal device is comprised in the list; an RSRP of the first terminal device measured at the second terminal device is above a first threshold; the first terminal device has a potential to improve a positioning performance at the second terminal device, and the potential is evaluated based on at least one terminal device and location information of the at least one terminal device, wherein the location information of the least one terminal device is used by the second terminal device; the achieved accuracy performance of the positioning of the second terminal device is below an accuracy requirement of the second terminal device; the uncertainty of the location information lies within the range of the accepted uncertainty; the hard-valued LOS-NLOS-indicator indicates a LOS link between the first terminal device and the second terminal device; a value of the soft-valued LOS-NLOS-indicator is above a second threshold; or any combination of two or more of the above-mentioned items.

In some embodiments, the capability information may be transmitted via sidelink control information (SCI) associated with the PRS. The capability information may be broadcasted to the second terminal device. The capability information may be groupcasted to the second terminal device.

In some embodiments, the request may be broadcasted to the first terminal device. The request may be unicasted to the first terminal device. In addition, the request may be groupcasted to the first terminal device.

In some embodiments, the apparatus further comprises means for performing other steps in some embodiments of the method 400. In some embodiments, the means comprises at least one processor and at least one memory including computer program code, the at least one memory and computer program code configured to, with the at least one processor, cause the performance of the apparatus.

In some embodiments, an apparatus capable of performing any of the method 500 (for example, the second terminal device 120) is provided. The apparatus may comprise means for performing the respective steps of the method 500. The means may be implemented in any suitable form. For example, the means may be implemented in a circuitry or software module.

In some embodiments, the apparatus comprises: means for receiving, at a second terminal device from a first terminal device, a positioning reference signal (PRS) along with capability information indicating a capability of the first terminal device to provide location information of the first terminal device; means for determining, based on the capability information, that the first terminal device transmits the PRS without the location information and has the capability to provide the location information; and means for transmitting, to the first terminal device, a request for the location information of the first terminal device.

In some embodiments, the capability information may comprise: one-bit indicator indicating whether the first terminal device has the capability to provide the location information, an uncertainty of the location information, or any combination of two of the above-mentioned items.

In some embodiments, the request may comprise: a list of at least one terminal device from which the second terminal device needs location information; a reference signal received power (RSRP) measurement by the second terminal device of a PRS transmitted by the first terminal device; an achieved accuracy performance of the positioning of the second terminal device; a requirement of accuracy performance of the positioning of the second terminal device; a line of sight (LOS)-non-line of sight (NLOS)-indicator measured for the at least one terminal device, wherein the LOS-NLOS-indicator comprises at least one of a hard-valued LOS-NLOS-indicator or a soft-valued LOS-NLOS-indicator; a number of the at least one terminal device that is available for absolute positioning of the second terminal device; an indication of at least one terminal device and the location information of the at least one terminal device, wherein the location information of the least one terminal device is used by the second terminal device; a request information for requesting the uncertainty of the location information; a range for an accepted uncertainty of the location information; or any combination of two or more of the above-mentioned items.

In some embodiments, the means for transmitting the request may comprise: means for determining whether the PRS has a potential to improve a positioning performance at the second terminal device; and means for based on determining the PRS has the potential to improve the positioning performance at the second terminal device, transmitting the request for the location information of the first terminal device.

In some embodiments, the means for determining whether the PRS has the potential to improve the positioning performance at the second terminal device may comprises means for determining: a RSRP of the PRS of the first terminal device measured at the second terminal device is above a first threshold; a relative angle of arrival of the PRS at the second terminal device lies within an azimuth or a vertical angular range; a hard-valued LOS-NLOS-indicator of the PRS indicates a LOS link between the first terminal device and the second terminal device; a value of the soft-valued LOS/NLOS indicator of the PRS is above a second threshold; or any combination of two or more of the above-mentioned items.

In some embodiments, the capability information may be received via SCI, associated with the PRS. The capability information may also be broadcasted from the first terminal device. In addition, the capability information may be groupcasted from the first terminal device.

In some embodiments, the request may be broadcasted to the first terminal device. The request may be unicasted to the first terminal device. The request may be groupcasted to the first terminal device.

In some embodiments, the apparatus may comprise means for receiving, from the first terminal device, the location information of the first terminal device along with a subsequent PRS.

In some embodiments, the apparatus further comprises means for performing other steps in some example embodiments of the method 500. In some example embodiments, the means comprises at least one processor and at least one memory including computer program code, the at least one memory and computer program code configured to, with the at least one processor, cause the performance of the apparatus.

Figure 6:
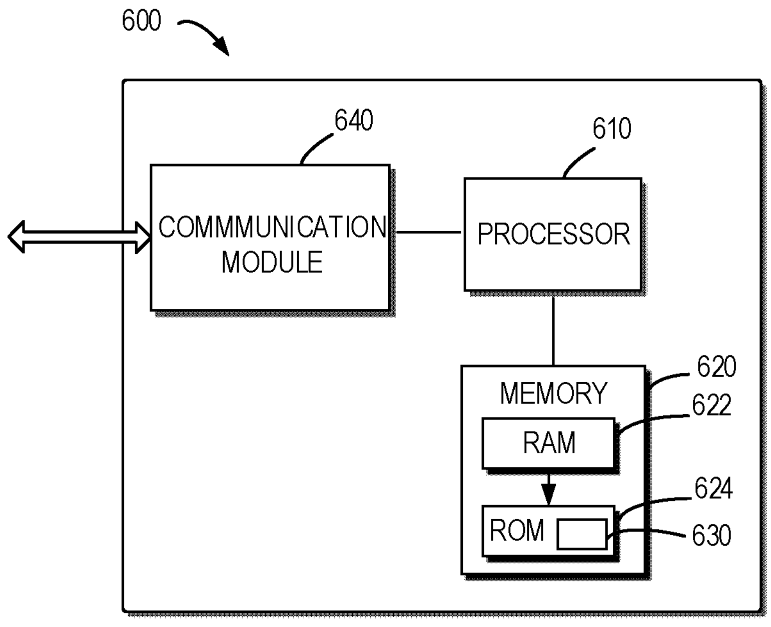
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the first terminal device 110 and the second terminal device 120 as shown in FIG. 1. As shown, the device 600 includes one or more processors 610, and one or more communication modules 640 coupled to the processor 610. The device 600 may further include one or more memories 620 coupled to the processor 610.

The communication modules 640 may be for bidirectional communications. The communication modules 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
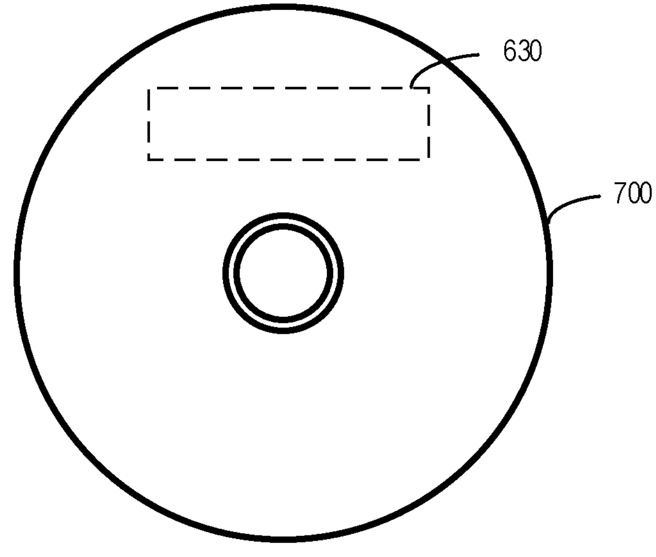
FIG. 7 illustrates a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIG. 4-FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device comprising:

at least one processor; and at least one memory storing instructions that, when executed by the at least one processor, cause the first terminal device at least to:

transmit capability information of the first terminal device along with a positioning reference signal (PRS), wherein the capability information indicates a capability to provide the location information of the first terminal device;

receive, from a second terminal device, a request for the location information of the first terminal device, wherein the request comprises at least one of the following:

a list of at least one terminal device from which the second terminal device needs location information;

a reference signal received power (RSRP) measurement by the second terminal device of a PRS transmitted by the first terminal device;

an achieved accuracy performance of the positioning of the second terminal device;

a requirement of accuracy performance of the positioning of the second terminal device;

a line of sight (LOS)-non-line of sight (NLOS)-indicator measured for the at least one terminal device, wherein the LOS-NLOS-indicator comprises at least one of a hard-valued LOS-NLOS-indicator or a soft-valued LOS-NLOS-indicator;

a number of the at least one terminal device that is available for absolute positioning of the second terminal device;

an indication of at least one terminal device and the location information of the at least one terminal device, wherein the location information of the least one terminal device is used by the second terminal device;

a request information for requesting the uncertainty of the location information; or a range for an accepted uncertainty of the location information; and based on receiving the request, transmit the location information along with a subsequent PRS.

2. The first terminal device of claim 1, wherein the capability information comprises at least one ohe following:

one-bit indicator indicating whether the first terminal device has the capability to provide the location information; or an uncertainty of the location information.

3. The first terminal device of claim 1, wherein the first terminal device is further caused to transmit the location information by:

determining whether to provide the location information along with the subsequent PRS; and based on determining to provide the location information along with the subsequent PRS, transmitting the location information along with the subsequent PRS.

4. The first terminal device of claim 3, wherein the first terminal device is caused to determining whether to provide the location information along with the subsequent PRS based on at least one of the following conditions:

the request is received from the second terminal device;

an identifier (ID) of the first terminal device is comprised in the list;

an RSRP of the first terminal device measured at the second terminal device is above a first threshold;

the first terminal device has a potential to improve a positioning performance at the second terminal device, and the potential is evaluated based on at least one terminal device and location information of the at least one terminal device, wherein the location information of the least one terminal device is used by the second terminal device;

the achieved accuracy performance of the positioning of the second terminal device is below an accuracy requirement of the second terminal device;

the uncertainty of the location information lies within the range of the accepted uncertainty;

the hard-valued LOS-NLOS-indicator indicates a LOS link between the first terminal device and the second terminal device; or a value of the soft-valued LOS-NLOS-indicator is above a second threshold.

5. The first terminal device of claim 1, wherein at least one of the following:

the capability information is transmitted via sidelink control information, SCI, associated with the PRS;

the capability information is broadcasted to the second terminal device; or the capability information is groupcasted to the second terminal device.

6. The first terminal device of claim 1, wherein at least one of the following:

the request is broadcasted from the second terminal device;

the request is unicasted from the second terminal device; or the request is groupcasted from the second terminal device.

7. A second terminal device comprising:

at least one processor; and at least one memory storing instructions that, when executed by the at least one processor, cause the second terminal device at least to:

receive, from a first terminal device, a positioning reference signal (PRS) along with capability information indicating a capability of the first terminal device to provide location information of the first terminal device;

determine, based on the capability information, that the first terminal device transmits the PRS without the location information and has the capability to provide the location information; and transmit, to the first terminal device, a request for the location information of the first terminal device, wherein the request comprises at least one of the following:

a list of at least one terminal device from which the second terminal device needs location information;

a reference signal received power (RSRP) measurement by the second terminal device of a PRS transmitted by the first terminal device;

an achieved accuracy performance of the positioning of the second terminal device;

a requirement of accuracy performance of the positioning of the second terminal device;

a line of sight (LOS)-non-line of sight (NLOS)-indicator measured for the at least one terminal device, wherein the LOS-NLOS-indicator comprises at least one of a hard-valued LOS-NLOS-indicator or a soft-valued LOS-NLOS-indicator;

a number of the at least one terminal device that is available for absolute positioning of the second terminal device;

an indication of at least one terminal device and the location information of the at least one terminal device, wherein the location information of the least one terminal device is used by the second terminal device;

a request information for requesting the uncertainty of the location information; or a range for an accepted uncertainty of the location information.

8. The second terminal device of claim 7, wherein the capability information comprises at least one of the following:

one-bit indicator indicating whether the first terminal device has an ability to provide the location information; or an uncertainty of the location information.

9. The second terminal device of claim 7, wherein the second terminal device is further caused to transmit the request by:

determining whether the PRS has a potential to improve a positioning performance at the second terminal device; and based on determining the PRS has the potential to improve the positioning performance at the second terminal device, transmitting the request for the location information of the first terminal device.

10. The second terminal device of claim 9, wherein the second terminal device is caused to determining whether the PRS has the potential to improve the positioning performance at the second terminal device based on at least one of the following conditions:

a RSRP of the PRS of the first terminal device measured at the second terminal device is above a first threshold;

a relative angle of arrival of the PRS at the second terminal device lies within an azimuth or a vertical angular range;

a hard-valued LOS-NLOS-indicator of the PRS indicates a LOS link between the first terminal device and the second terminal device; or a value of the soft-valued LOS/NLOS indicator of the PRS is above a second threshold.

11. The second terminal device of claim 7, wherein at least one of the following:

the capability information is received via sidelink control information, SCI, associated with the PRS;

the capability information is broadcasted from the first terminal device; or the capability information is groupcasted from the first terminal device.

12. The second terminal device of claim 7, wherein at least one of the following:

the request is broadcasted to the first terminal device;

the request is unicasted to the first terminal device; or the request is groupcasted to the first terminal device.

13. The second terminal device of claim 7, wherein the second terminal device further is caused to:

receive, from the first terminal device, the location information of the first terminal device along with a subsequent PRS.

14. A method, comprising:

transmitting, at a first terminal device, capability information of the first terminal device along with a positioning reference signal (PRS), wherein the capability information indicates a capability to provide the location information of the first terminal device;

receiving, from a second terminal device, a request for the location information of the first terminal device, wherein the request comprises at least one of the following:

a list of at least one terminal device from which the second terminal device needs location information;

a reference signal received power (RSRP) measurement by the second terminal device of a PRS transmitted by the first terminal device;

an achieved accuracy performance of the positioning of the second terminal device;

a requirement of accuracy performance of the positioning of the second terminal device;

a line of sight (LOS)-non-line of sight (NLOS)-indicator measured for the at least one terminal device, wherein the LOS-NLOS-indicator comprises at least one of a hard-valued LOS-NLOS-indicator or a soft-valued LOS-NLOS-indicator;

a number of the at least one terminal device that is available for absolute positioning of the second terminal device;

an indication of at least one terminal device and the location information of the at least one terminal device, wherein the location information of the least one terminal device is used by the second terminal device;

a request information for requesting the uncertainty of the location information; or a range for an accepted uncertainty of the location information; and based on receiving the request, transmitting the location information along with a subsequent PRS.

* * * * *